United States Patent [19]

Beck

[11] Patent Number: 4,728,475

[45] Date of Patent: Mar. 1, 1988

[54] METHOD OF AND DEVICE FOR ADMIXING FINELY DIVIDED DYE STUFF INTO A SYNTHETIC GRANULATE

[75] Inventor: Arnold Beck, Neumuenster, Fed. Rep. of Germany

[73] Assignee: Neumünstersche Maschinen-und Apparatebau GmbH, Neumünster, Fed. Rep. of Germany

[21] Appl. No.: 893,567

[22] Filed: Aug. 5, 1986

[30] Foreign Application Priority Data

Sep. 27, 1985 [DE] Fed. Rep. of Germany ....... 3534403

[51] Int. Cl.[4] .......................... B29B 7/88; B29C 47/10
[52] U.S. Cl. ........................................ 264/211; 264/78;
264/177.2; 264/349; 366/76; 366/178; 425/145;
425/207
[58] Field of Search ............. 264/349, 75, 211, 176 F,
264/328.18, 73, 78, 176.1, 177.2; 425/582, 145,
207, 376 R; 366/76, 173, 167, 178

[56] References Cited

U.S. PATENT DOCUMENTS

| | | | |
|---|---|---|---|
| 2,802,648 | 8/1957 | Christensen et al. | 366/178 |
| 3,148,412 | 9/1964 | Spreeuwers | 366/178 |
| 3,228,065 | 1/1966 | Cournoyer et al. | 366/178 |
| 3,477,698 | 11/1969 | Smith et al. | 366/76 |
| 3,532,326 | 10/1970 | Schilling et al. | 366/178 |
| 3,732,345 | 5/1973 | Amos et al. | 264/211 |
| 3,871,629 | 3/1975 | Hishida | 366/76 |
| 3,892,390 | 7/1975 | Eauclaire | 366/76 |
| 3,948,491 | 4/1976 | Karlsson | 366/76 |
| 3,989,229 | 11/1976 | Noguchi et al. | 366/76 |
| 4,021,022 | 5/1977 | Satterfield, III et al. | 366/76 |

FOREIGN PATENT DOCUMENTS

| | | |
|---|---|---|
| 1629721 | 11/1967 | Fed. Rep. of Germany . |
| 2162308 | 12/1971 | Fed. Rep. of Germany . |
| 2416248 | 4/1974 | Fed. Rep. of Germany . |
| 2737868 | 8/1977 | Fed. Rep. of Germany . |
| 3146667A1 | 11/1981 | Fed. Rep. of Germany . |
| 54-126259 | 10/1979 | Japan ................................. 264/211 |

Primary Examiner—Jay H. Woo
Assistant Examiner—James C. Housel
Attorney, Agent, or Firm—Michael J. Striker

[57] ABSTRACT

A synthetic granulate is fed into an extruder through an inclined upper part transiting into a short vertical lower part communicating with an inlet in the extruder. A down shaft of smaller diameter for feeding a stream of a dye stuff projects through the inclined part and terminates about midway in the vertical lower part. The stream of synthetic granulate forms below the outlet of the filling channel a funnel-shaped cavity onto which a stream of dosed dye stuff continuously falls. The interface of the cavity with the synthetic granules is continuously renewed and thus a uniform stream of the dye stuff is admixed to the granules.

9 Claims, 3 Drawing Figures

METHOD OF AND DEVICE FOR ADMIXING FINELY DIVIDED DYE STUFF INTO A SYNTHETIC GRANULATE

BACKGROUND OF THE INVENTION

The present invention relates to a method of admixing a finely divided dye stuff to a stream of synthetic granulate passing through a fall shaft into an extruder, particularly a synthetic fiber extruder. The invention relates also to a device for carrying out this method.

From the German publication DE-OS No. 16 29 721 devices for dyeing a synthetic granulate fed into screw-type extruders are known. In these devices in which this invention has originated, a charging funnel is seated at the rear end of the extruder and communicates with an upright filling shaft for the synthetic granulate. A horizontal feeding shaft equipped with machine or conveying means for the dye stuff opens laterally into the filling shaft. In an exemplary embodiment of this prior art device, the dye stuff is in the form of a cylinder which is pressed by a spring against an abrasive disc; the separated particles pass through a downwardly sloping short channel into the filling shaft. In another embodiment the filling pipe for the dye stuff is provided with a screw conveyor and the dye stuff is supplied from a container or scraped off from a cylinder-shaped dye stuff body and again fed through a downwardly inclined channel into the filling shaft. In these prior art embodiments only a coarse metering or dosing of the dye stuff is possible. However, such a coarse dosing does not meet requirements in the production of high quality synthetic fibers.

German publication DE-OS No. 21 62 308 is concerned with a method for producing multicolor fibers of irregularly changing colors. In this known method, different dye stuffs in the form of pellets are supplied at predetermined time intervals in a statistical sequence through a charging pipe which is separated from the so-called supply pocket for the synthetic granulate, into the upstream end of the screw extruder so as to fall into an empty helical section of the screw extruder. The rotating screw of the extruder conveys the charge of pellets into the supply pocket where they are mixed with the synthetic granules and subsequently the mixture is conveyed into the melt to be extruded. This kind of feeding of the dye stuff is suitable for special applications. However, to achieve a uniformly dyed synthetic fibers used for spinning, the requisite uniformity of the mixture is not obtained, especially in the case when the dye stuff is for example in the form of granules or powders which tend to form lumps or nodules, or plugs or bridges in the screw extruder or in the charging pipe. Moreover, when the dye is changed the cleaning of the rear end of the screw extruder is extremely difficult.

Since the prior art devices for admixing a dye stuff into a synthetic granulate do not enable a uniform and exact admixing of the dye stuff, it is conventional in spinning plants to equip the inlets to the extruder with an additional mixer into which metered quantities or doses of the synthetic granulate and of the dye stuff are supplied (DE-OS No. 24 16 248, DE-OS No. 27 37 868; DE-OS No. 31 46 667). However, even these known solutions, in spite of increased expenditures, do not always yield satisfactory results. For example, due to differences in the size and density of the granules, and due to electrostatic charges there may occur dissociation or separation processes in the mixer leading to an irregular coloration of the melt.

SUMMARY OF THE INVENTION

It is therefore a general object of this invention to avoid the disadvantages of the prior art mixing method and devices of this kind.

In particular, it is an object of this invention to provide such an improved method which guarantees a uniform mixing action of dosed amounts of dye stuff with the synthetic granules without the risk of dissociation.

Another object of this invention is to provide a device for carrying out the novel method which is simple in construction and easy to maintain and to clean.

In keeping with these objects and others which will become apparent hereafter, one feature of this invention resides, in a method which includes the steps of forming in the stream of synthetic granulate a cavity whose interface with the granulate slopes toward an entrance into the extruder, and feeding by gravity the dosed dye stuff against the sloping interface. In this manner, the stream of synthetic granulte which continously forms the sloping interface with the cavity immediately entrains the dye stuff without jamming or piling up the latter and without dissociating processes.

Preferably the cavity has the form of funnel whereby a stream of dosed dye stuffs continuously falls into its center.

In the device of this invention, the filling shaft for the synthetic granulate has a downwardly sloping upper part transiting into a vertical lower part which communicates with an entrance into the extruder, and a vertical filling channel for the dye stuff arranged above and communicating with the vertical lower part of the filling shaft. In this arrangement, the stream of synthetic granulate when flowing past the opening of the vertical channel for the dye stuff continuously forms a sloping interface with the interior of the filling channel.

In order to allow a free fall of the stream of the dye stuff and to prevent any jamming or piling up of the dye stuff on the sloping interface, it is of importance that the ratio of cross-sectional areas between the lower part of the filling shaft and the vertical filling channel does not exceed 6:1. The higher is the ratio between the dosed amount of the dye stuff and the filled amount of synthetic granulate, the lower is the ratio of the cross-sectional areas. Preferably, the ratio is between 4:1 and 1:1.

In a preferred embodiment of the device of this invention the inlet of the vertical filling channel is provided with a funnel arranged below a discharge opening of a dosing apparatus for the dye stuff. In this manner, no measures are necessary for matching the output of the dosing apparatus to the stream of the synthetic granules and if desired several dosing devices can be arranged above the funnel.

With advantage, the lower part of the vertical filling channel projects a length into the filling shaft so that the stream of synthetic granulate forms a funnel shaped cavity below the exit opening of the filling channel. The filling channel is coaxial with the lower part of the filling shaft. By virtue of this arrangement, the falling stream of the dye staff does not touch the inner walls of the filling channel and consequently no deposits of the dye form on the inner wall and also the cleaning of the entire system is greatly facilitated.

In order to further facilitate the cleaning, the vertical filling channel is in the form of an exchangeable pipe or includes an exchangeable attachment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
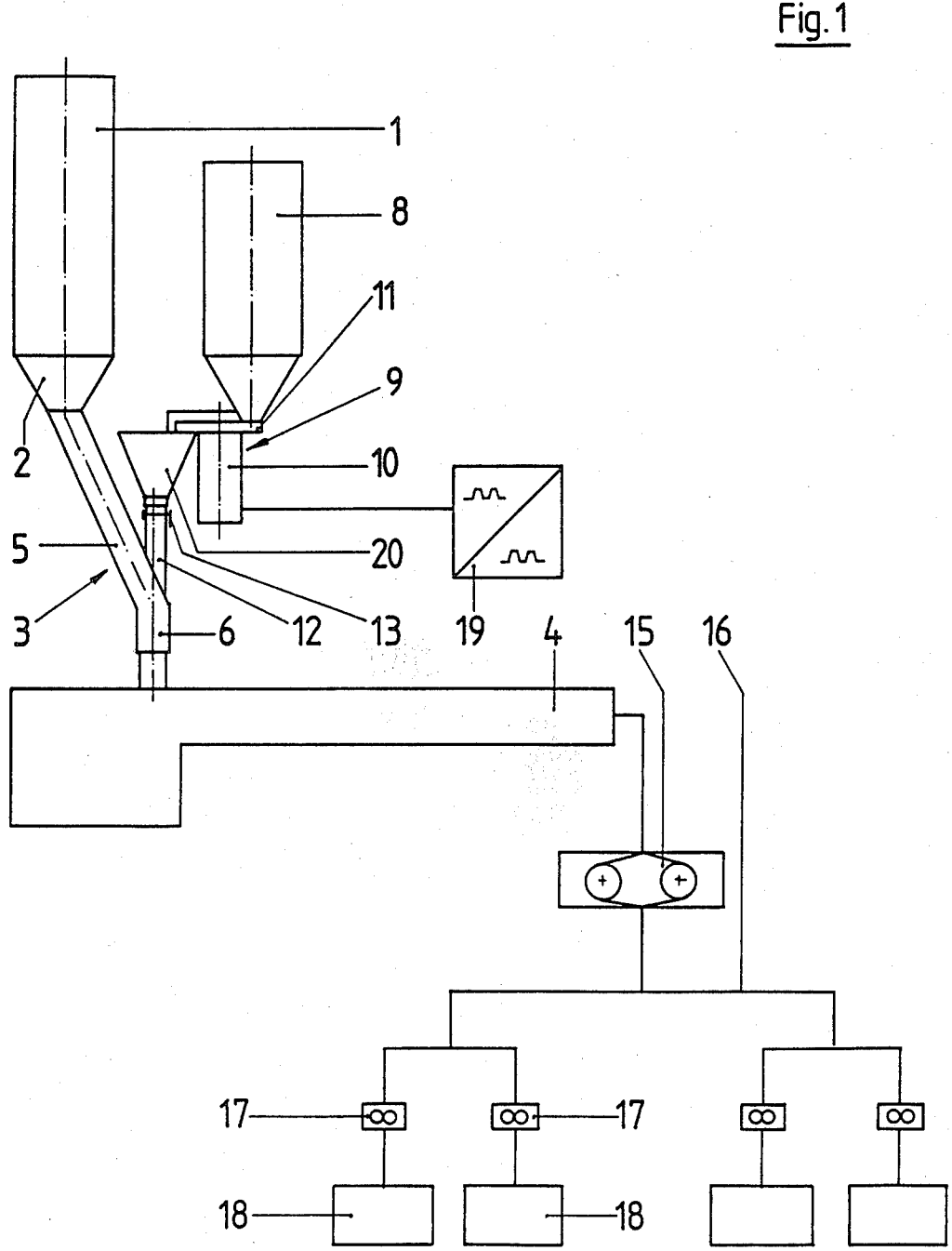
FIG. 1 shows schematically a spinning plant including the mixing device of this invention.

A supply silo 1 for synthetic granulate has an funnel-shaped bottom portion 2 whose outlet opening communicates with an inclined upper part 5 of a filling chute or shaft 3. The inclined part 5 transits into a relatively short vertical lower part 6 which is connected to an intake opening of a screw extruder 4. The vertical lower part 6 which is in the form of a cylindrical pipe is partially made of a transparent glass 7 to serve as an inspection window.

Figure 2:
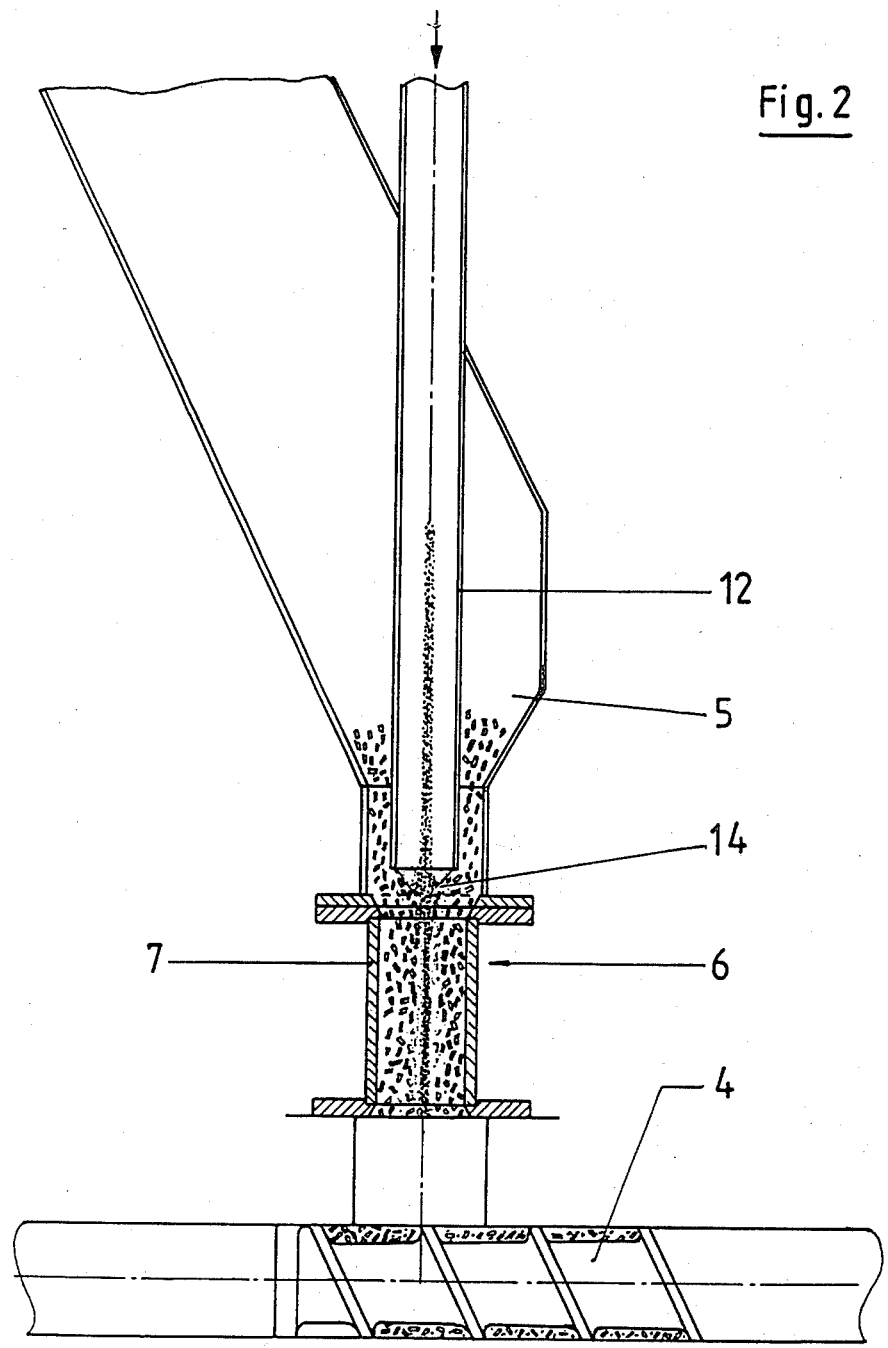
FIG. 2 shows on an erlarged scale a sectional view of the mixing device of FIG. 1.

Near the supply silo 1 there is arranged a smaller supply container 8 filled with a dye stuff granulate. The bottom portion of container 8 has also a funnel-like configuration whose outlet opening communicates with a conventional commercially available dosing station 9. The dosing station includes a synchronous electromotor 10 driving a horizontal disc 11 whose periphery is provided with a plurality of small dosing chambers for receiving the dye stuff from the container 8. The dosed dye stuff is discharged into a funnel 20 connected to a vertical down shaft 12. The down shaft is preferably in the form of an exchangeable pipe arranged concentrically above the vertical lower part 6 of the filling shaft 3 and being suspended in a holder 13. The down shaft 12 opens into or passes through the top of the inclined upper part 5 of the filling shaft. In the embodiment of FIGS. 1 and 2, the vertical down shaft 12 terminates in the region of the vertical lower part 6 of the filling shaft. In this case, it is necessary that the diameter of the tubular lower part 6 be about twice as large as is the diameter of the down shaft 12, that means the ratio of cross-sectional areas of the two coaxially arranged tubes be about 4:1. The distance between the outlet of the down shaft 12 and the upper surface of the screw extruder 4 amounts, depending on the height of the inspection glass pipe 7 to about 3 to 4 diameters of the lower part 6.

In operation, the synthetic granulate falling from the silo 1 forms a densely packed stream in the entire filling shaft 3 to continously supply the screw extruder 4 with such an amount of synthetic material which is required for the subsequent fiber spinning device. No dosing measures are required for the feed of the synthetic granulate. Due to the projecting down pipe or down shaft 12 of smaller diameter, a funnel-shaped batter or cavity 14 is formed in the granule stream immediately below the end of the down shaft 12 in the vertical lower part 6. The interface or inner wall of the funnel-shaped cavity slopes toward the inlet of the extruder and its shape is continuously renewed by the incoming synthetic granulate material.

It will be seen from FIG. 2, that a narrow stream of the dye stuff discharged from the dosing station 9 freely falls along the central axis of the down pipe 12 onto the center of the cavity 14. As it will be described below, the dye granulate is admixed to the synthetic granulate in an exactly predetermined ratio, for example 5%. The continuously renewed funnel-shaped cavity 14, actually sucks in the dye stuff into the synthetic granulate whereby in the core of the column of synthetic granulates below the funnel-shaped cavity 14 a vertical vein of highly concentrated dye stuff results. Even if the dye stuff is supplied intermittently by the volume metering dosing station 9 and arrives in the form of a string of discrete small portions, the vertical vein of highly concentrated dye stuff is practically uniform over the entire height of the core column in the lower part 6. In other words, for any arbitrarily thin section of the column of granulate in lower part 6, the contents of the dye stuff is substantially uniform. For this purpose, it is of importance that the free falling string of the dye stuff in down pipe 12 be adjusted such as to avoid any jamming or piling up of the dye stuff during its confluence with the sloping wall within the cavity 14. In any event, the plugging of the outlet of the down pipe 12 must be prevented. The condition for the prevention of the plugging, namely that the volume of the individual doses of the dye stuff be smaller than the volume of the funnel-shaped cavity 14 is easy to fulfill by the proper dlmensioning of the dosing device and of the diameters of the pipes 6 and 12. The smaller is the height of column between the cavity 14 and the screw of the extruder, the smaller is the danger of dissociation of the two components in this path of travel.

In extruder 4, the synthetic granulate becomes melted in conventional manner. Due to the mixing action of the extruder a completely uniform coloring of the melt is achieved. The melt discharged from the extruder is applied through an exchangeable filter 15 into a distribution system 16 consisting of a plurality of branched conduits, pumps 17 and arrays of nozzles 18 through which the spinning fibers are formed.

Each spinning pump 17 is driven by a non-illustrated synchronous electric motor. The power supply for all electric motors takes place through a common non-illustrated converter whose secondary side delivers alternating current at a frequency corresponding to the desired rotary speed of the spinning pump 17. The product of the frequency and of the number of respective pumps is proportional to the flow rate of the melted material through the extruder 4.

The synchronous electric motor 10 of the dosing station 9 is power supplied from a second converter 19 whose output rate or frequency is set to be proportional to the aforementioned product. The proportionality factor determines the amount of the dosed dye stuff.

In changing the color of the dye stuff, the smooth vertical down shaft 6 is easy to clean or can be simply replaced in its holder 13. The lower part of the filling shaft 3 does not need any cleaning inasmuch as the dye stuff does not come in contact with its inner walls. For cleaning the extruder and the subsequent component parts, the whole system is charged for a short period with the synthetic granulate alone without the addition of the dye stuff.

Since the cleaning of the dosing station requires more time, it is of advantage when several dosing stations are provided above the funnel 20.

The construction of dosing station 9 is not part of this invention and this invention is not limited to a particular design of the dosing system. In a modification of the illustrated embodiment, the volume metering dosing station can be replaced by a conventional gravimetrically operating dosing station. The latter is recommended when extremely high requirements are put on the uniformity of the dyeing or if the volumetric dosing would result in excessively long intervals between the intermittent metered quantities.

This invention is applicable also in the case when the dye stuff is not in the form of a granulate but as a finely divided powder or in a liquid phase.

Figure 3:
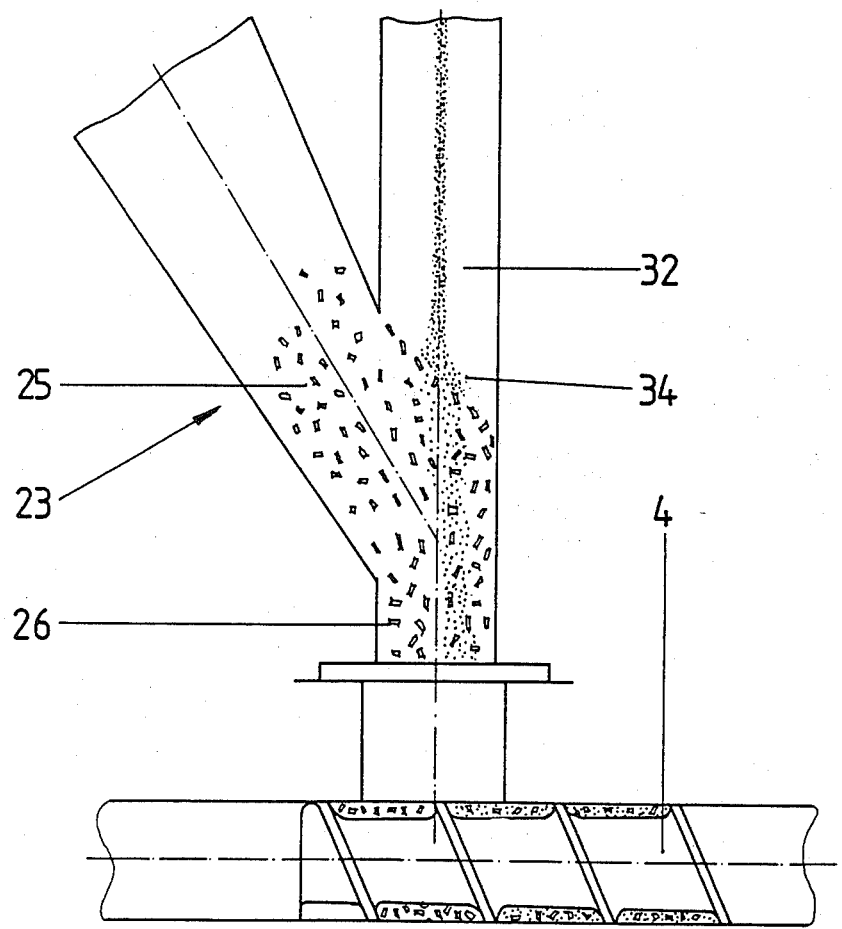
FIG. 3 is a sectional side view of another embodiment of the mixing device of this invention.

In the embodiment illustrated in FIG. 3 the feeding part includes a filling shaft 23 for synthetic granulate consisting of an inclined upper part 25 leading from the outlet of a non-illustrated supply silo, and transiting into a short, vertical lower part 26 of rectangular cross-section communicating with an intake opening of an extruder 4. The down shaft 32 for feeding in a dye stuff opens into the top of the sloping part 25 at a region above the upright lower part 26. The vertical cross-section of the down shaft 32 corresponds to that of the lower part 26 of the filling shaft 23 whereby the inclined upper part 25 forms an obtuse angle with the latter.

In this embodiment the stream of synthetic granulate advancing through the inclined upper part 25 forms a sloping interface with the opening of the down shaft 32. Similarly as in the preceding example, the soping interface represents a wall of a cavity which is continuously renewed by the incoming stream of the synthetic granulate and a string of the dosed dye stuff freely falls along the canter of the pipe 32 thereon. Otherwise the mode of operation in this embodiment is completely analogous to the before described example of FIG. 2.

While the invention has been illustrated and described as embodied in a spinning plant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of admixing a finely divided dye stuff to a stream of synthetic granulate comprising the steps of feeding a densely packed stream of said granulate through an interspace formed between an inner wall of a fall shaft and an outer wall of an upright filling channel, the fall shaft communicating with an inlet of an extruder and the filling channel having an outlet opening into the fall shaft at a distance above said inlet, whereby a sloping cavity is continuously formed within said stream of granulate below the outlet of said filling channel; and dosing the dye stuff and feeding said dye stuff by free fall through said filling channel into said cavity.

2. A method as defined in claim 1 wherein said cavity has a funnel-shaped configuration sloping toward said inlet of the extruder.

3. A device for mixing a finely divided dye stuff into a stream of synthetic granulate fed into an extruder, comprising a filling shaft for the synthetic granulate, the filling shaft including an inclined upper part and a vertical lower part communicating with an intake opening of the extruder; a vertical filling channel for the dye stuff arranged above and communicating with the vertical lower part of the filling shaft; the ratio of cross-sections of said lower part of the filling shaft and said filling channel being smaller than 6:1 to produce a funnel-shaped cavity in the stream of synthetic granulate below said filling channel; and said vertical filling channel having an inlet provided with a funnel for feeding against sloping walls of said cavity a narrow string of the dye stuff free falling substantially along a center axis of the filling channel.

4. A device as defined in claim 3 wherein said extruder is a screw extruder.

5. A device as defined in claim 3 wherein said vertical lower part is shorter than said upper part of the filling shaft.

6. A device as defined in claim 3 wherein said ratio of cross-sections is between 4:1 and 1:1.

7. A device as defined in claim 3, wherein said vertical filling channel for tha dye stuff passes through said upper part and partially projects into said lower part of the filling shaft for the synthetic granulate.

8. A device as defined in claim 3, wherein said vertical filling channel opens into said sloping upper part above said lower part of the filling shaft for the synthetic granulate and being substantially of the same cross-section as said lower part.

9. A device as defined in claim 7, further comprising holding means and said vertical filling channel being in the form of an exchangeable pipe suspended in said holding means.

* * * * *